UNITED STATES PATENT OFFICE.

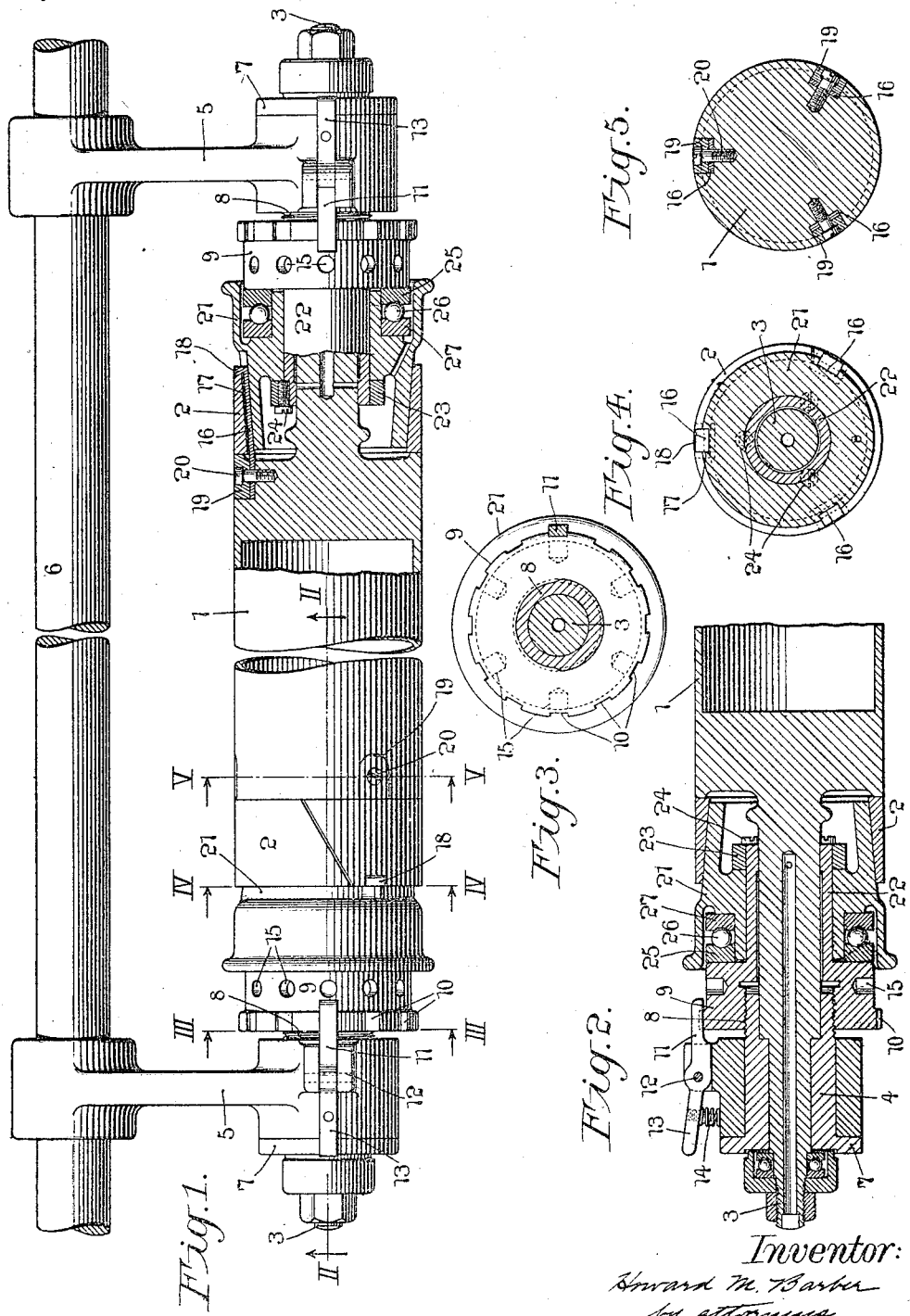

HOWARD M. BARBER, OF STONINGTON, CONNECTICUT, ASSIGNOR TO C. B. COTTRELL & SONS COMPANY, OF NEW YORK, N. Y., A CORPORATION OF DELAWARE.

COMPENSATING GUIDE-ROLL FOR WEBS.

1,288,801.

Specification of Letters Patent.

Patented Dec. 24, 1918.

Application filed March 3, 1917. Serial No. 152,395.

*To all whom it may concern:*

Be it known that I, HOWARD M. BARBER, a citizen of the United States, and resident of Stonington, in the county of New London and State of Connecticut, have invented a new and useful Improvement in Compensating Guide-Rolls for Webs, of which the following is a specification.

Heretofore, when the usual compensating roll for webs has been properly adjusted to bring an imperfect web, such as one having either a tight and a loose edge, into proper side register, the web will be caused to wrinkle badly, the object of my invention is to provide means for eliminating these wrinkles so that the web may be brought into register both longitudinally and transversely.

My invention more particularly includes a web compensating roll having a non-expansible body with either or both of its ends expansible, means being provided for expanding and contracting the end or ends of the roll to properly register the web both longitudinally and transversely.

A practical embodiment of my invention is represented in the accompanying drawings, in which, Figure 1 represents, partly in side elevation and partly in section, one of my web compensating guide rolls.

Fig. 2 is a detail longitudinal central section taken in the plane of the line II—II of Fig. 1.

Fig. 3 is a cross section taken in the plane of the line III—III of Fig. 1,

Fig. 4 is a cross section taken in the plane of the line IV—IV of Fig. 1, and

Fig. 5 is a cross section taken in the plane of the line V—V of Fig. 1.

The web compensating guide roll comprises the non-expansible body 1, the expansible ends 2, and the shaft 3. Bushings 4 for the shaft are located in the ends of roll supporting arms 5 projecting from the bar or other support 6. The bushings 4 are provided with heads 7 engaging the outer faces of the arms 5, and are also provided with exteriorly threaded inner ends 8. Adjusting nuts 9 are screw threaded on to the inner ends 8 of the bushing 4, each of which nuts may be provided with an annular series of recesses 10 for engagement by one arm 11 of a locking lever pivoted at 12 to the arm 5, the other arm 13 of which lever is arranged in position to be manually depressed to release the arm 11. A spring 14 is shown interposed between the arm 5 and the arm 13 of the locking lever for normally holding the lever in its locked engagement with the nut 9. Each adjusting nut is also provided with an annular series of holes 15 for engagement by a wrench or other suitable tool (not shown), turning the nut to adjust its position.

Each of the expansible ends of the web compensating guide roll is herein shown as a split ring having a flaring bore and a cylindrical periphery. Means are provided for securing the split end rings to the body of the roll, which means in the present instance, is shown as a series of retainers 16 located in grooves 17 in the bore of the ring and having heads 18 engaging the outer end of the end ring.

Retainer clamps 19 are provided flush with the periphery of the body of the roll, and screws 20 serves to secure the retainer clamps and retainers to the said body. This arrangement is such that it permits the end ring to expand and contract without displacement with respect to the roll. These rings are normally contracted and their degree of expansion is controlled by plugs 21 rotatably mounted on the inner extensions 22 of the adjusting nuts 9, but movable endwise therewith. Collars 23 are secured to the extensions 22 by longitudinal screws 24 and the plugs 21 are held against endwise movement between the collars 23 and the heads of the nuts.

Antifriction thrust bearings 25, 26, 27, are interposed between the nuts and their plugs. These plugs have tapered exterior surfaces fitted within the flaring bores of the expansible end rings 2.

In operation, when it is found that the web is beginning to wrinkle, either or both ends of the roll may be manipulated as follows. The locking lever is released from its engagement with the adjusting nut 9 and the adjusting nut is turned on its bushing in a direction to force the plug 21 inwardly. This will expand its end ring 2, thus increasing the diameter of the roll at this point. When this adjustment has been made to the utmost accuracy, the locking lever may be brought into engagement with the nut to hold it in such adjustment.

It will be seen from the above description that the diameter of the ends of the roll may be increased or diminished without affecting the body of the roll and while the roll and web are running, thereby insuring accurate longitudinal and transverse register of the web in a very simple and effective manner.

It is evident that slight changes may be resorted to in the form, construction and arrangement of the several parts without departing from the spirit and scope of my invention, and hence I do not wish to limit myself strictly to the structure herein shown and described, but,

What I claim is:

1. A web compensating guide roll and means operable while the roll is running, to independently expand and contract the ends of the roll.

2. A web compensating guide roll including a non-expansible body having an expansible end on which the edge of the web runs, and means operable to expand and contract the end for bringing the web into register both longitudinally and transversely.

3. A web compensating guide roll including a non-expansible body having an expansible end on which the edge of the web runs and means operable while the roll is running, to expand and contract the end for bringing the web into register both longitudinally and transversely.

4. A web compensating guide roll including a non-expansible body having expansible ends on which the edges of the web run and means operable to expand and contract said ends for bringing the web into register both longitudinally and transversely.

5. A web compensating guide roll having a non-expansible body having expansible ends and means operable while the roll is running, to expand and contract the said ends.

6. A web compensating guide roll including a non-expansible body having expansible ends and means operable to independently expand and contract said ends.

7. A web compensating guide roll including a non-expansible body having expansible ends and means operable while the roll is running, to independently expand and contract said ends.

8. A web compensating guide roll including a non-expansible body having an expansible end ring secured thereto on which the edge of the web runs, and a plug movable longitudinally in the end ring to expand and contract the ring for bringing the web into register both longitudinally and transversely.

9. A web compensating guide roll including a non-expansible body having expansible end rings secured thereto on which the edges of the web run and plugs movable longitudinally in the end rings to expand and contract the rings for bringing the web into register both longitudinally and transversely.

10. A web compensating guide roll including a non-expansible body having an expansible end ring secured thereto on which the edge of the web runs, a plug movable longitudinally in the end ring to expand and contract the ring for bringing the web into register both longitudinally and transversely and an adjusting nut for moving said plug.

11. A web compensating guide roll including a non-expansible body having expansible end rings secured thereto on which the edges of the web run, plugs movable longitudinally in the end rings to expand and contract the rings for bringing the web into register both longitudinally and transversely and adjusting nuts for moving the plugs.

12. A web compensating guide roll including a non-expansible body having an expansible end ring secured thereto on which the edge of the web runs, a bushing, an adjusting nut threaded thereon and a plug rotatably mounted on the nut and movable longitudinally in the end ring to expand and contract the ring for bringing the web into register both longitudinally and transversely.

13. A web compensating guide roll including a non-expansible body having expansible end rings secured thereto on which the edges of the web run, bushings, adjusting nuts threaded thereon and plugs rotatably mounted on the adjusting nuts and movable longitudinally in the end rings to expand and contract the rings for bringing the web into register both longitudinally and transversely.

14. A web compensating guide roll including a non-expansible body having an expansible end ring secured thereto, a bushing, an adjusting nut threaded thereon, a plug rotatably mounted on the nut and movable longitudinally in the ring to expand and contract the ring, and an antifriction thrust bearing interposed between the adjusting nut and plug.

15. A web compensating guide roll including a non-expansible body having expansible end rings secured thereto, bushings, adjusting nuts threaded thereon, plugs rotatably mounted on the adjusting nuts and movable longitudinally in the end rings to expand and contract the rings and antifriction thrust bearings interposed between the adjusting nuts and plugs.

16. A web compensating guide roll including a non-expansible body having an expansible end ring secured thereto on which the edge of the web runs, a plug movable longitudinally in the end ring to expand and contract the ring for bringing the web into register both longitudinally and transversely, an adjusting nut for said plug and means for locking the nut in its different adjustments.

17. A web compensating guide roll including a non-expansible body having expansible end rings secured thereto on which the edges of the web run, plugs movable longitudinally in the end rings to expand and contract the rings for bringing the web into register both longitudinally and transversely, adjusting nuts for the plugs and means for locking the nuts in their different adjustments.

In testimony, that I claim the foregoing as my invention, I have signed my name this 28th day of February, 1917.

HOWARD M. BARBER.

Copies of this patent may be obtained for five cents each, by addressing the "Commissioner of Patents, Washington, D. C."